US009903629B2

United States Patent
Kamiya et al.

(10) Patent No.: US 9,903,629 B2
(45) Date of Patent: Feb. 27, 2018

(54) HEAT PUMP DEVICE, AIR CONDITIONER, AND FREEZER

(75) Inventors: Shota Kamiya, Tokyo (JP); Kazunori Hatakeyama, Tokyo (JP); Kenta Yuasa, Tokyo (JP); Shinya Matsushita, Tokyo (JP); Shinsaku Kusube, Tokyo (JP); Tsutomu Makino, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 503 days.

(21) Appl. No.: 14/401,869

(22) PCT Filed: Jun. 20, 2012

(86) PCT No.: PCT/JP2012/065767
§ 371 (c)(1),
(2), (4) Date: Nov. 18, 2014

(87) PCT Pub. No.: WO2013/190665
PCT Pub. Date: Dec. 27, 2013

(65) Prior Publication Data
US 2015/0096320 A1    Apr. 9, 2015

(51) Int. Cl.
*F25B 49/02*    (2006.01)
*F24F 1/20*    (2011.01)
(Continued)

(52) U.S. Cl.
CPC .............. *F25B 49/025* (2013.01); *F24F 1/20* (2013.01); *F25B 49/022* (2013.01); *F24F 3/001* (2013.01);
(Continued)

(58) Field of Classification Search
CPC .................. F25B 49/025; F25B 49/022; F24F 2011/0013
See application file for complete search history.

(56) References Cited

U.S. PATENT DOCUMENTS

2005/0155369 A1*  7/2005  Ootori .................. F24F 11/001
                                                            62/228.1
2012/0111043 A1   5/2012  Hatakeyama et al.
(Continued)

FOREIGN PATENT DOCUMENTS

JP    S60-68341 U    5/1985
JP    S61-91445 A    5/1986
(Continued)

OTHER PUBLICATIONS

Office Action dated Sep. 9, 2015 in the corresponding CN application No. 201280073434.3 (with English translation).
(Continued)

*Primary Examiner* — Keith Raymond
*Assistant Examiner* — Nael Babaa
(74) *Attorney, Agent, or Firm* — Posz Law Group, PLC

(57) ABSTRACT

A heat pump device includes: a compressor including a compression mechanism compressing a refrigerant and a motor driving the compression mechanism; an inverter unit applying a voltage for driving the motor; an inverter control unit generating a driving signal for driving the inverter unit; and temperature sensors detecting temperatures of the compressor, wherein the inverter control unit includes a normal operation mode in which a refrigerant is compressed by performing a normal operation of the compressor and a heating operation mode in which a heating operation of the compressor is performed by applying, to the motor, a high-frequency voltage, and in the heating operation mode, the inverter control unit determines an amplitude and a phase of a voltage command for generating the high-frequency voltage on a basis of a temperatures detected by the temperature sensors and a necessary amount of heat specified in advance.

13 Claims, 9 Drawing Sheets

(51) Int. Cl.
  *H02M 7/48* (2007.01)
  *F25B 13/00* (2006.01)
  *F24F 11/00* (2018.01)
  *F24F 3/00* (2006.01)

(52) U.S. Cl.
  CPC ............. *F24F 2011/0013* (2013.01); *F24F 2011/0083* (2013.01); *F25B 13/00* (2013.01); *F25B 2313/003* (2013.01); *F25B 2341/0662* (2013.01); *F25B 2400/053* (2013.01); *F25B 2400/054* (2013.01); *F25B 2400/13* (2013.01); *F25B 2600/021* (2013.01); *F25B 2700/2106* (2013.01); *F25B 2700/2115* (2013.01); *H02M 7/48* (2013.01); *Y02B 30/741* (2013.01)

(56) References Cited

U.S. PATENT DOCUMENTS

| 2012/0234031 A1 | 9/2012 | Hatakeyama et al. |
| 2013/0152609 A1 | 6/2013 | Hatakeyama et al. |
| 2013/0199224 A1 | 8/2013 | Kato et al. |

FOREIGN PATENT DOCUMENTS

| JP | S62-180 U | 1/1987 | | |
| JP | H04-179876 A | 6/1992 | | |
| JP | H08-226714 A | 9/1996 | | |
| JP | H11-142006 A | 5/1999 | | |
| JP | H11-159467 A | 6/1999 | | |
| JP | H11-324934 A | 11/1999 | | |
| JP | 2000-145640 A | 5/2000 | | |
| JP | 2000-161210 A | 6/2000 | | |
| JP | 2000-292014 A | 10/2000 | | |
| JP | 2007-166766 A | 6/2007 | | |
| JP | 2011-2190 A | 1/2011 | | |
| JP | 2011-038689 A | 2/2011 | | |
| JP | 2011-144966 A | 7/2011 | | |
| JP | 2011-179768 A | 9/2011 | | |
| JP | 2012-82996 A | 4/2012 | | |
| WO | 2011/074145 A1 | 6/2011 | | |
| WO | WO 2011074145 A1 * | 6/2011 | ............ | F25B 49/025 |
| WO | 2012/029099 A1 | 3/2012 | | |
| WO | WO 2012029099 A1 * | 3/2012 | ........ | H02M 7/53875 |
| WO | 2012/059957 A1 | 5/2012 | | |

OTHER PUBLICATIONS

Extended European Search Report dated Mar. 31, 2016 issued in corresponding EP patent application No. 12879536.6.
Office Action dated Mar. 10, 2015 issued in corresponding JP patent application No. 2014-521153 (and English translation).
International Search Report of the International Searching Authority dated Aug. 28, 2012 for the corresponding international application No. PCT/JP2012/065767 (and English translation).
Office Action dated Mar. 11, 2016 in the corresponding CN application No. 201280073434.3 (with partial English translation).

* cited by examiner

| VOLTAGE VECTOR | VOLTAGE DIRECTION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | −U | 0 | 1 | 1 | 1 | 0 | 0 |
| V4 | +U | 1 | 0 | 0 | 0 | 1 | 1 |
| V5 | −V | 1 | 0 | 1 | 0 | 1 | 0 |
| V6 | −W | 1 | 1 | 0 | 0 | 0 | 1 |
| V7 | 0 | 1 | 1 | 1 | 0 | 0 | 0 |

HEAT PUMP DEVICE, AIR CONDITIONER, AND FREEZER

CROSS REFERENCE TO RELATED APPLICATION

This application is a U.S. national stage application of International Patent Application No. PCT/JP2012/065767 filed on Jun. 20, 2012, the contents of which are incorporated herein by reference.

TECHNICAL FIELD

The present invention relates to a heat pump device that uses a compressor and particularly to a heat pump device that is used in an air conditioner, a freezer, a water heater, and the like.

BACKGROUND

Heat pump devices exist that supply a high-frequency low voltage to a compressor during a shutdown during heating in order to improve the rising speed of the air conditioner when heating is started (for example, see Patent Literature 1). A similar technique is used in a heat pump device that supplies a single-phase AC voltage having a higher frequency than that at the time of a normal operation to a compressor when it is detected that the temperature of the air conditioner's surroundings becomes low (for example, see Patent Literature 2).

Moreover, in order to prevent the refrigerant stagnation phenomenon from occurring, a heat pump device exists that generates, as driving signals for a compressor motor, signals to be output with a predetermined static phase angle in the PWM (Pulse Width Modulation) output in a two-phase modulation system during the locked energization for preheating the compressor (for example, see Patent Literature 3).

In general, as a stagnation prevention measure for a compressor, during a shutdown of the compressor, the inside of the compressor is heated by a heater or locked energization (a voltage with which a compressor motor is not driven) is applied to the winding of the compressor motor by an inverter to heat the inside of the compressor. However, there is a problem in that electric power is always consumed for heating the inside of the compressor during a shutdown and the standby power increases. Therefore, in heating control for the compressor in the past, the outside air temperature is detected by an outside air temperature detector and, when the detected outside air temperature is equal to or higher than a predetermined value, the heating by the locked energization or the heater is stopped to reduce the power consumption (for example, see Patent Literature 4).

The system explained above is a system for predicting the refrigerant state in the compressor by detecting the outside air temperature or temperatures in other parts, and there is a system for directly detecting the refrigerant state by setting, in the compressor, a sensor that detects the refrigerant state. This system includes a heater that heats the compressor and an insulation resistance sensor that detects an electric resistance of a refrigerant and refrigerant oil. When the insulation resistance value detected by the sensor is equal to or smaller than a predetermined value, the heater is energized and the refrigerant oil is heated to prevent two-phase separation of the refrigerant. When the insulation resistance value is equal to or larger than the predetermined value, the energization to the heater is stopped to attain a reduction in power consumption (for example, see Patent Literature 5).

PATENT LITERATURE

Patent Literature 1: Japanese Unexamined Utility Model Registration Application Publication No. S60-68341
Patent Literature 2: Japanese Patent Application Laid-Open No. S61-91445
Patent Literature 3: Japanese Patent Application Laid-Open No. 2007-166766
Patent Literature 4: Japanese Patent Application Laid-Open No. 2000-292014
Patent Literature 5: Japanese Patent Application Laid-Open No. 2000-145640

The above Patent Literatures 1 and 2 disclose a technique facilitating a lubricating action in the compressor by heating the compressor or keeping the compressor warm by applying a high-frequency AC voltage to the compressor in response to a decrease in outside air temperature.

However, there is no detailed description in Patent Literature 1 of the high-frequency low voltage, and the output change, which depends on the stop position of the rotor, is not taken into consideration. Therefore, there is a problem in that the desired amount of heat for the compressor may not be obtained.

In contrast, there is a description in the above Patent Literature 2 of an application of a voltage from a high-frequency (e.g., 25 kilohertz) single-phase AC power supply and the effects, such as noise reduction due to being outside the audible range, vibration suppression due to being outside the resonance frequency, input reduction and prevention of temperature increase due to the reduction in current by the amount of inductance in the winding, and rotation suppression of the rotating part of the compressor.

However, in the technique in Patent Literature 2, because a high-frequency single-phase AC power supply is used, a fully-off period, during which all the switching elements are off, is generated for a relatively long time as shown in FIG. 3 in Patent Literature 2. At this point, a high-frequency current is regenerated to the DC power supply without it flowing back to the motor via the freewheeling diodes and the current decays fast during the off-period; therefore, there is a problem in that a high-frequency current does not efficiently flow to the motor and thus the heating efficiency of the compressor degrades. Moreover, when a small motor having low iron loss is used, the amount of heat generation becomes small with respect to the applied voltage; therefore, there is a problem in that the necessary amount of heat cannot be obtained with a voltage that is within the usable range.

Moreover, Patent Literature 3 discloses a technique of performing preheating such that the rotor does not rotate by performing locked energization in which a DC current is caused to flow in the motor winding.

However, the winding resistance of a motor tends to decrease due to the highly efficient design of recent motors. Therefore, in the case of the preheating method of causing a DC current to flow in the motor winding as described in Patent Literature 3, because the amount of heat generation is given by the product of the winding resistance and the square of the current, the current is increased by the amount of reduction of the winding resistance. Consequently, a problem arises with the heat generation due to the increase of the inverter loss and also other problems arise such as a decrease in reliability and an increase in the cost of heat dissipation structures.

In the heating control for the compressor described in Patent Literature 4, the heating time of the compressor is reduced according to the outside air temperature and the power consumption during a shutdown is reduced. However, the refrigerant state inside the compressor is predicted from the outside air temperature; therefore, the refrigerant state is not surely detected. A refrigerant in the refrigerant circuit during a shutdown has a characteristic that the refrigerant concentrates in the lowest temperature part. When the outside air temperature is low, i.e., when the temperature difference between the indoor unit and the outdoor unit becomes large, the refrigerant often stagnates in the compressor. However, there is a state in which, because of the temperature difference in the refrigerant circuit of the outdoor unit, even when the outside air temperature is high, the temperature of the compressor becomes the lowest in the refrigerant circuit of the outdoor unit. In some case, even when the outside air temperature is low, in the refrigerant circuit of the outdoor unit, the outdoor heat exchanger has a lower temperature than the compressor and the refrigerant does not stagnate in the compressor. Therefore, unnecessary electric power is consumed because the inside of the compressor is heated even when heating of the compressor is actually unnecessary (refrigerant stagnation does not occur). Further, when refrigerant stagnation occurs for which the heating of the compressor is actually necessary, the heating of the compressor may be stopped and a failure, such as shaft breakage of the compressor, may occur.

In the freezing device described in Patent Literature 5, the insulation resistance sensor is set below the feed oil pipe of the compressor and the two-phase separation of the refrigerant and the refrigerant oil is detected according to the insulation resistance. The energization to the heater is performed only when the insulation resistance is equal to or lower than the predetermined value and the refrigerant oil is heated to reduce the power consumption during the stop. However, there is a problem in that a high-cost insulation resistance sensor is necessary to accurately detect the insulation resistance.

SUMMARY

The present invention has been achieved in view of the above and an object of the present invention is to obtain a heat pump device, an air conditioner, and a freezer capable of stably heating a compressor.

Further, an object of the present invention is to obtain a heat pump device, an air conditioner, and a freezer capable of efficiently realizing necessary heating.

In order to solve the above problems and achieve the object, the present invention relates to a heat pump device including: a compressor that includes a compression mechanism that compresses a refrigerant and a motor that drives the compression mechanism; an inverter that applies a voltage for driving the motor; an inverter control unit that generates a driving signal for driving the inverter; and a temperature sensor that detects a temperature of the compressor, wherein the inverter control unit includes a heating operation mode in which a heating operation of the compressor is performed by applying, to the motor, a high-frequency voltage and a normal operation mode in which a refrigerant is compressed by performing a normal operation of the compressor, and in the heating operation mode, the inverter control unit determines an amplitude and a phase of a voltage command for generating the high-frequency voltage on a basis of a temperature detected by the temperature sensor and a necessary amount of heat specified in advance.

The heat pump device according to the present invention attains an effect that it is possible to prevent the refrigerant stagnation phenomenon by stably and efficiently heating the compressor and thus realizing energy saving.

DETAILED DESCRIPTION

Exemplary embodiments of a heat pump device, an air conditioner, and a freezer according to the present invention will be explained in detail below with reference to the drawings. The present invention is not limited by the embodiments.

First Embodiment

Figure 1:
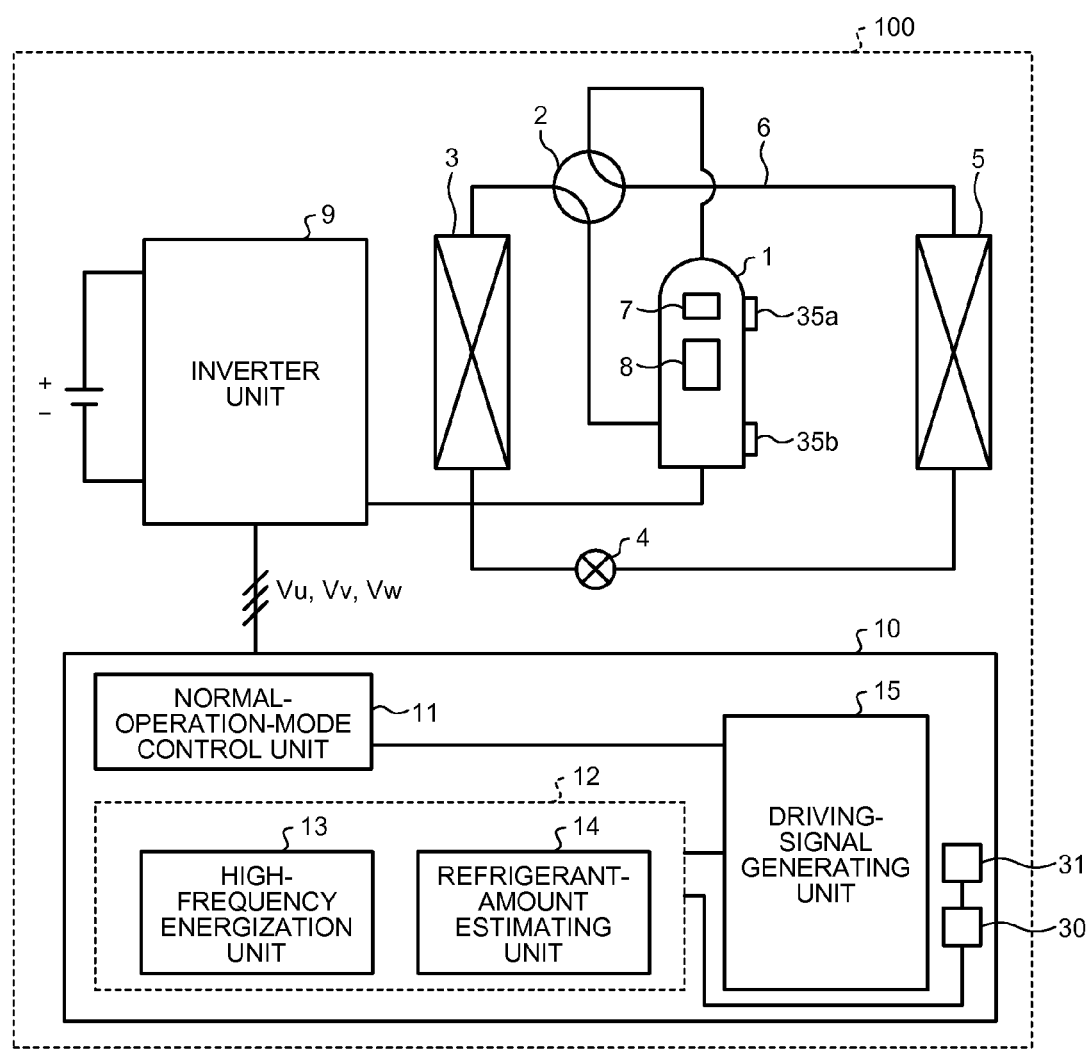
FIG. 1 is a diagram showing a configuration example of a heat pump device in a first embodiment.

FIG. 1 is a diagram showing a configuration example of a first embodiment of a heat pump device according to the present invention. A heat pump device 100 according to the present embodiment is configured, for example, as an air conditioner and includes a refrigeration cycle in which a compressor 1, a four-way valve 2, a heat exchanger 3, an expansion mechanism 4, and a heat exchanger 5 are sequentially connected via a refrigerant pipe 6. A compression mechanism 7, which compresses a refrigerant, and a motor 8, which actuates the compression mechanism 7, are provided in the compressor 1. The motor 8 is a three-phase motor including windings of three phases, i.e., U-phase, V-phase, and W-phase.

An inverter unit 9, which applies a voltage to the motor 8 to drive the motor 8, is electrically connected to the motor 8. The inverter unit 9 uses a DC voltage (bus voltage) Vdc as a power supply and applies voltages Vu, Vv, and Vw to the U-phase, V-phase, and W-phase windings of the motor 8, respectively. The inverter unit 9 is electrically connected to an inverter control unit 10. The inverter control unit 10 includes a normal-operation-mode control unit 11, a heatingoperation-mode control unit 12, which includes a refrigerant-amount estimating unit 14 and a high-frequency energization unit 13, a driving-signal generating unit 15, an ambient-temperature detecting unit 31, and a refrigerant-amount determining unit (heating operation start time) 30. The inverter control unit 10 outputs signals (e.g., PWM signals) for driving the inverter unit 9 to the inverter unit 9.

In the inverter control unit 10, the normal-operation-mode control unit 11 is used when the heat pump device 100 performs a normal operation. The normal-operation-mode control unit 11 controls the driving-signal generating unit 15 such that it outputs, as inverter driving signals, PWM signals for rotationally driving the motor 8.

The heating-operation-mode control unit 12 is used when the compressor 1 is heated. The heating-operation-mode control unit 12 controls the driving-signal generating unit 15 such that it outputs, as inverter driving signals, PWM signals for heating the compressor 1 without rotationally driving the motor 8 by causing a high-frequency current (a high-frequency voltage) to flow that the motor 8 cannot follow. In that case, the high-frequency energization unit 13 controls the driving-signal generating unit 15 on the basis of the estimation result of the refrigerant amount estimated by the refrigerant-amount estimating unit 14 according to the signals received from temperature sensors 35a and 35b that detect the temperature of the compressor 1. The driving-signal generating unit 15 outputs PWM signals on the basis of the control from the high-frequency energization unit 13 and drives the inverter unit 9 to warm and vaporize, in a short time, a liquid refrigerant stagnated in the compressor 1 and discharges the liquid refrigerant to the outside of the compressor 1.

Figure 2:
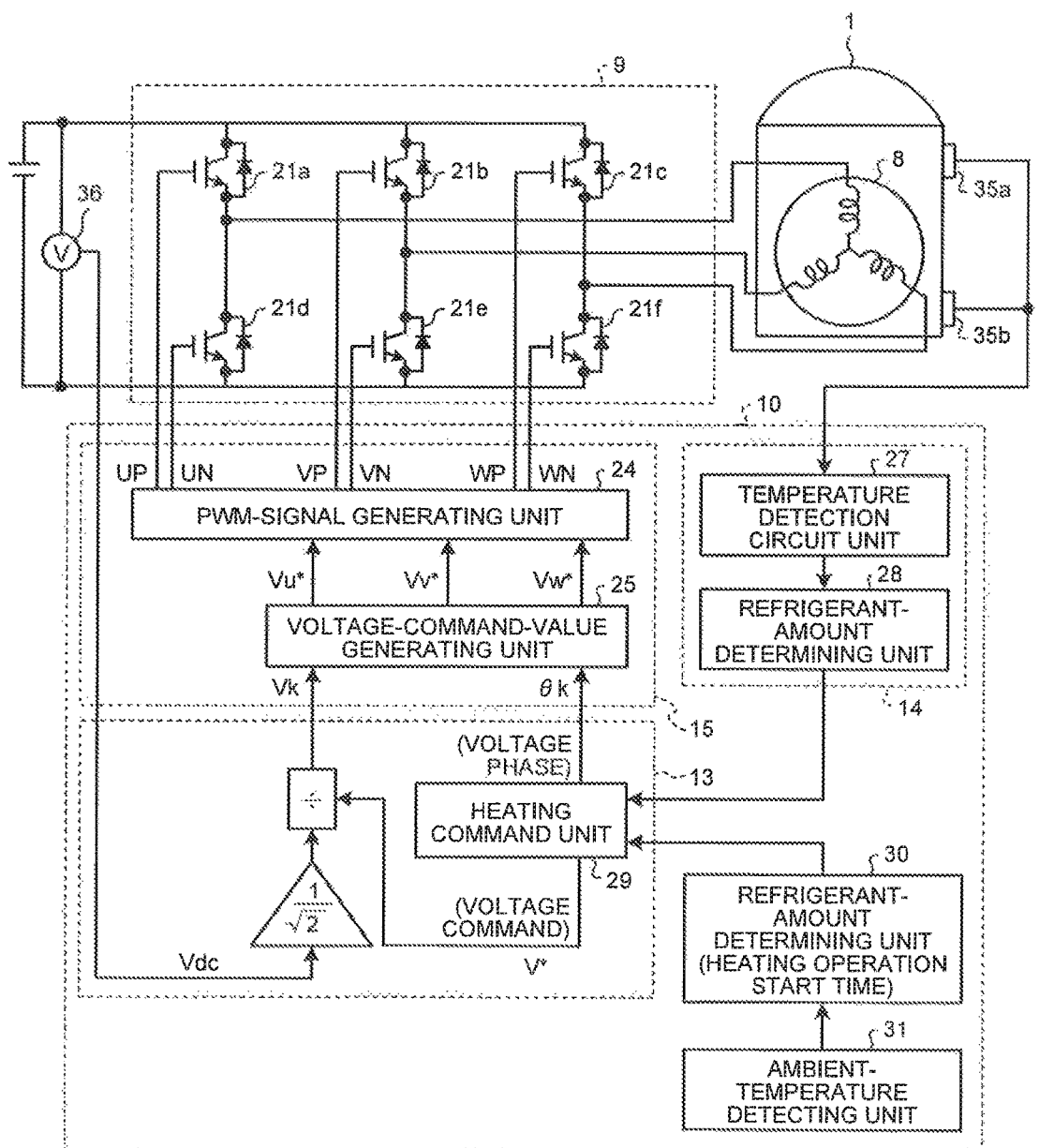
FIG. 2 is a diagram showing an example of a main portion configuration of the heat pump device.

FIG. 2 is a diagram showing an example of a main portion configuration of the heat pump device. As shown in FIG. 2, the inverter unit 9 uses a bus voltage Vdc as a power supply and includes six switching elements (21a, 21b, 21c, 21d, 21e, and 21f). The inverter unit 9 is a circuit in which three series connecting units configured by switching elements on the upper side (a character representing upper side elements is P) and the lower side (a character representing lower side elements is N) are connected in parallel. The inverter unit 9 drives the switching elements in accordance with respective PWM signals (UP, UN, VP, VN, WP, and WN), which are driving signals input from the inverter control unit 10, to generate three-phase voltages Vu, Vv, and Vw and then applies these voltages to the U-phase, V-phase, and W-phase windings of the motor 8, respectively. A voltage sensor 36 to detect Vdc is provided on the input side of the inverter unit 9 (the side from which the bus voltage Vdc is supplied).

The inverter unit 10 includes the refrigerant-amount estimating unit 14 and the high-frequency energization unit 13, from which the heating-operation-mode control unit 12 shown in FIG. 1 is configured, and the driving-signal generating unit 15. The refrigerant-amount estimating unit 14 includes a temperature detection circuit unit 27 and a refrigerant-amount determining unit 28. The high-frequency energization unit 13 includes a heating command unit 29. The inverter control unit 10 includes the ambient-temperature detecting unit 31 and the refrigerant-amount determining unit (heating operation start time) 30 that determines the refrigerant amount according to a signal received from the ambient-temperature detecting unit. The driving-signal generating unit 15 includes a voltage-command-value generating unit 25 and a PWM-signal generating unit 24. In FIG. 2, only the components that perform a characteristic operation in the heat pump device in the present embodiment are shown and the normal-operation-mode control unit 11 shown in FIG. 1 is not shown.

The heating-operation-mode control unit 12 (the refrigerant-amount estimating unit 14 and the high-frequency energization unit 13) generates a high-frequency voltage command Vk and a high-frequency phase command θk in a heating operation mode and inputs the high-frequency voltage command Vk and the high-frequency phase command θk to the driving-signal generating unit 15.

In the driving-signal generating unit 15, the voltage-command-value generating unit 25 generates voltage command values Vu*, Vv*, and Vw* for the respective three phases (U-phase, V-phase, and W-phase) on the basis of the high-frequency voltage command Vk and the high-frequency phase command θk that are input from the high-frequency energization unit 13. The PWM-signal generating unit 24 generates the PWM signals (UP, VP, WP, UN, VN, and WN) on the basis of the three-phase voltage command values Vu*, Vv*, and Vw* and drives the inverter unit 9, thereby causing the inverter unit 9 to apply a voltage to the motor 8. At this point, a high-frequency voltage is applied so that the rotor of the motor 8 does not rotate and the compressor 1 (see FIG. 1) that includes the motor 8 is heated. The driving-signal generating unit 15 generates the PWM signals even when the heat pump device is operating in the normal operation mode. In this case, the PWM-signal generating method is similar to that in the case of operating in the heating operation mode except that information (information equivalent to Vk and θk described above) to be input is different.

The characteristic operations of the heat pump device in the first embodiment are explained in detail below. The refrigerant-amount estimating unit 14 estimates the refrigerant amount according to difference information between the temperatures detected by the temperature sensors 35a and 35b and difference information between the temperatures and the initial temperature. The detection signals from the temperature sensors 35a and 35b are input to the temperature detection circuit unit 27. The temperature detection circuit unit 27 calculates, on the basis of the detection results of the temperature sensors 35a and 35b, a difference (difference information) between the temperatures detected by the temperature sensors 35a and 35b or differences (difference information) between the temperatures and the initial temperature. The difference information is input to the refrigerant-amount determining unit 28. The refrigerant-amount determining unit 28 estimates the refrigerant state (the refrigerant amount) on the basis of the input difference information and outputs the estimation result to the heating command unit 29. As the detection timing of the temperature sensors 35a and 35b, the detection is always performed in the beginning and during the heating. Note that, in the present embodiment, the positions and the number of the temperature sensors 35a and 35b are not particularly limited. It is satisfactory as long as the temperature of the compressor can be detected and the difference information can be obtained by a plurality of temperature sensors.

The ambient-temperature detecting unit 31 detects the outside air temperature (the ambient temperature) and inputs the detection result to the refrigerant-amount determining unit (heating operation start time) 30. The refrigerant-amount determining unit (heating operation start time) 30 estimates the refrigerant state (the refrigerant amount) on the basis of the outside air temperature.

There has been a method of predicting the refrigerant state in the compressor from the outside air temperature and, when the outside air temperature is equal to or lower than a predetermined value, determining that the refrigerant is in the stagnation state. The ambient-temperature detecting unit 31 and the refrigerant-amount determining unit (heating operation start time) 30 in the present embodiment determine whether the refrigerant is in the stagnation state on the basis of the outside air temperature in this way. However, such estimation based on the outside air temperature is not estimation for surely detecting the refrigerant state. In particular, the refrigerant in the refrigerant circuit during a shutdown has a characteristic that the refrigerant concentrates in the lowest temperature part. When the outside air temperature is low, i.e., when the temperature difference between the indoor unit and the outdoor unit is large, the refrigerant often stagnates in the compressor.

Therefore, in the present embodiment, the temperature of the compressor 1 is detected by the temperature sensors 35a and 35b to make it possible to accurately recognize the refrigerant state even during a shutdown. For example, it is determined using the estimation result of the refrigerant state based on the outside air temperature whether the heating operation is started, and the high-frequency phase command θk during the heating operation is calculated using the estimation result of the refrigerant amount calculated by the temperature sensors 35a and 35b.

In the high-frequency energization unit 13 functioning as an amplitude-phase determining unit, the heating command unit 29 determines the heating output on the basis of the estimation result of the refrigerant amount received from the refrigerant-amount estimating unit 14 and the determination result of the refrigerant amount received from the refrigerant-amount determining unit 30. An example of a method for estimating the refrigerant amount by the refrigerant-amount estimating unit 14 is explained below.

In the heat pump device in the present embodiment, the refrigerant amount is estimated and the heating command unit 29 generates and outputs the high-frequency phase command θk on the basis of the estimation result of the refrigerant amount such that the necessary amount of heat generation can be obtained and stably heats the compressor 1. Consequently, it is possible to set the voltage phase θk for obtaining the heating output corresponding to the refrigerant amount. Further, it is possible to provide the heating performance desired by the user while realizing energy saving by adjusting the voltage phase and the voltage command value according to the refrigerant amount.

The heating command unit 29 calculates, on the basis of the estimation signal (the estimation result of the refrigerant amount) received from the refrigerant-amount estimating unit 14 (the refrigerant-amount determining unit 28), the voltage phase θk for energizing the motor 8. For example, when the winding of the motor 8 corresponding to the position of 0° is energized, θk=0 is output. However, if the winding is continuously energized at a fixed value, only a specific portion of the motor 8 may generate heat; therefore, θk may be caused to change over time.

As explained above, if the refrigerant amount can be estimated, it is possible to discharge a liquid refrigerant by performing heating as needed. By energizing the motor 8 with the output corresponding to the estimation result, the liquid refrigerant in the compressor 1 can be surely discharged and thus the reliability of the device is improved. When the refrigerant amount is small, energy saving is attained by adjusting the output.

The heating command unit 29 outputs, on the basis of the necessary amount of heat, a voltage command V* necessary for heat generation. It is possible to obtain the voltage command V* according to the necessary amount of heat, for example, by prestoring the relation between the necessary amount of heat and the voltage command V* as table data. The necessary amount of heat is information specified by the user.

The high-frequency energization unit 13 generates the high-frequency voltage command Vk on the basis of the bus voltage Vdc detected by the voltage sensor 36 and the voltage command V* input from the heating command unit 29. The high-frequency voltage command Vk is represented by the following equation using the voltage command V* and the bus voltage Vdc:

$$Vk = V^* \times \sqrt{2}/Vdc$$

The data on the temperature information received from the ambient-temperature detecting unit 31 and the temperature sensors 35a and 35b and the configuration of the compressor may be taken into consideration, and the high-frequency voltage command Vk may be corrected on the basis of these data. By correcting the data in this way, it is possible to obtain a more accurate value corresponding to the operating environment and improve reliability.

The angular frequency ω can be increased by setting the driving frequency of the high-frequency current high. A high angular frequency ω can increase iron loss and thus increase the amount of heat generation; therefore, energy can be saved. If high-frequency energization is performed with a frequency that is within the human audible range, noise is generated due to the electromagnetic sound of the motor 8; therefore, the frequency is set to be outside the audible range (for example, 20 kilohertz or higher). Note that at least one of the frequency, the phase, and the amplitude of the high-frequency current can be set by an input from the user.

Next, an explanation will be made of an operation of generating the PWM signals as driving signals for the inverter unit 9 by the driving-signal generating unit 15.

In the driving-signal generating unit 15 that generates PWM signals, first, the voltage-command-value generating unit 25 generates the voltage command values Vu*, Vv*, and Vw* on the basis of the high-frequency voltage command Vk and the phase command θk.

The motor 8 is a three-phase motor. In the case of a three-phase motor, three phases, i.e., U, V, and W, are generally different from each other by 120° (=2π/3). Therefore, the voltage-command-value generating unit 25 generates, as Vu*, Vv*, and Vw*, the voltage command values of the respective phases by assigning the high-frequency voltage command Vk and the voltage phase θk respectively to V* and θ of the cosine curves (sine curves) having phases different by 2π/3 from each other as shown in Equations (1) to (3) below.

$$Vu^* = V^* \times \cos\theta \tag{1}$$

$$Vv^* = V^* \times \cos(\theta - (2\pi/3)) \tag{2}$$

$$Vw^* = V^* \times \cos(\theta + (2\pi/3)) \tag{3}$$

When the voltage command values Vu*, Vv*, and Vw* are generated by the voltage-command-value generating unit 25, the PWM-signal generating unit 24 compares the voltage command values Vu*, Vv*, and Vw* input from the voltage-command-value generating unit 25 with the carrier signal (reference signal) having an amplitude Vdc/2 at a predetermined frequency to generate the PWM signals UP, VP, WP, UN, VN, and WN on the basis of the relation of their magnitudes to each other.

In Equations (1) to (3) described above, the voltage command values Vu*, Vv*, and Vw* are obtained using a simple trigonometric function; however, the voltage command values Vu*, Vv*, and Vw* may be obtained using other methods, such as a two-phase modulation, a third-harmonic superposition modulation, and a space vector modulation.

The method of generating the PWM signals by the PWM-signal generating unit 24 is explained in detail here. Because the methods of generating the PWM signals corresponding to the U-phase, V-phase, and W-phase are the same, the method of generating the PWM signals UP and UN of the U-phase is explained here as an example.

Figures 3, 4:
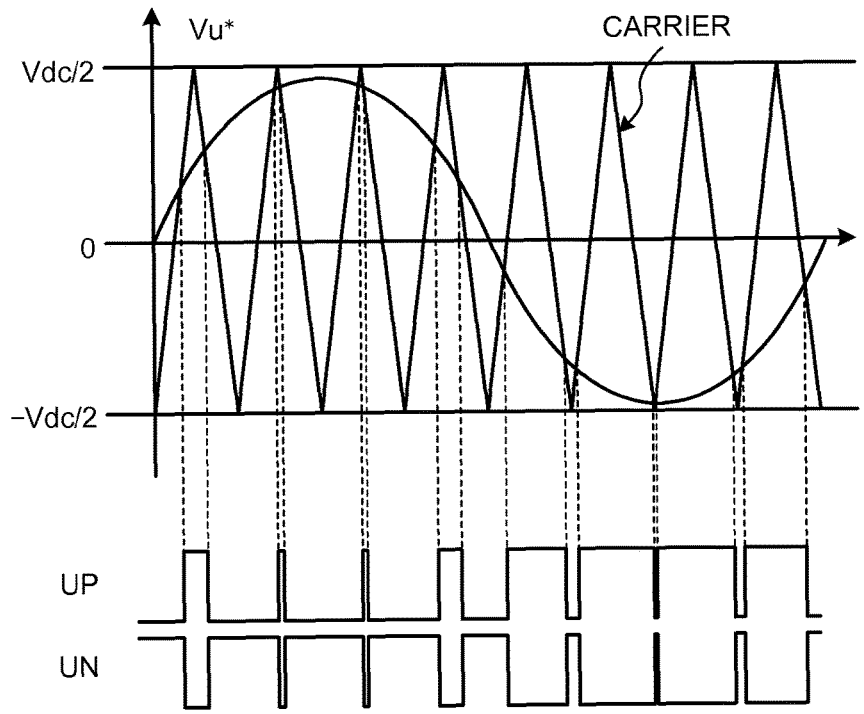
FIG. 3 is a diagram showing a method of generating signals for one phase (a U phase) by a PWM-signal generating unit.
FIG. 4 is a chart showing eight switching patterns in the first embodiment.

FIG. 3 is a diagram showing the method of generating signals for one phase by the PWM-signal generating unit 24 and shows the method of generating the PWM signals of the U-phase. The triangular wave shown in FIG. 3 indicates the carrier signal and the sine curve shown in FIG. 3 indicates the voltage command value Vu*. The signal generating method shown in FIG. 3 typically corresponds to the method referred to as an asynchronous PWM. The PWM-signal generating unit 24 compares the voltage command value Vu* with the carrier signal having the amplitude Vdc/2 (Vdc indicates a DC bus voltage) at a predetermined frequency and generates the PWM signals UP and UN on the basis of the relation of their magnitudes to each other. In other words, when the carrier signal is larger than the voltage command value Vu*, the PWM signal UP is on and the PWM signal UN is off and, in other cases, the PWM signal UP is off and the PWM signal UN is on. The amplitude and phase of the carrier signal are fixed.

FIG. 4 is a chart showing eight switching patterns in the first embodiment. In FIG. 4, reference symbols V0 to V7 denote voltage vectors generated in the respective switching patterns. The voltage directions of the respective voltage vectors are indicated by ±U, ±V, and ±W (and 0 when the voltage is not generated). Here, "+U" means a voltage for generating a current in the U-phase direction, which flows into the motor 8 via the U-phase and flows out from the motor 8 via the V-phase and the W-phase, and "−U" means a voltage for generating a current in the −U phase direction, which flows into the motor 8 via the V-phase and the W-phase and flows out from the motor 8 via the U-phase. The same applies to ±V and ±W.

The inverter unit 9 can be caused to output desired voltages by combining the switching patterns shown in FIG. 4 and outputting a voltage vector. In the case of an operation (operation in the normal operation mode) in which a refrigerant in the compressor 1 is compressed by the motor 8, the motor 8 is typically operated at a frequency between several tens of hertz and several kilohertz. At this point, a high-frequency voltage exceeding several kilohertz can be output by changing θk at high speed and the compressor 1 can be energized and heated (the heating operation mode).

However, in the case of a general inverter, the carrier frequency, which is the frequency of the carrier signal, has an upper limit due to the switching speed of the switching elements of the inverter. Therefore, it is difficult to output a high-frequency voltage having a frequency equal to or higher than the carrier frequency. In the case of a general IGBT (Insulated Gate Bipolar Transistor), the upper limit of the switching speed is about 20 kilohertz. When the frequency of the high-frequency voltage becomes about 1/10 of the carrier frequency, adverse effects may occur such as deterioration of the waveform output accuracy of the high-frequency voltage and superposition of the DC components. In other words, when the carrier frequency is set to 20 kilohertz, if the frequency of the high-frequency voltage is set equal to or lower than 2 kilohertz, which is 1/10 of the carrier frequency, then the frequency of the high-frequency voltage falls within the audible frequency range and therefore noise may increase. Therefore, the PWM-signal generating unit 24 generates the PWM signals synchronized with the carrier signal by the method described below, thereby avoiding an increase in noise.

Figure 5:
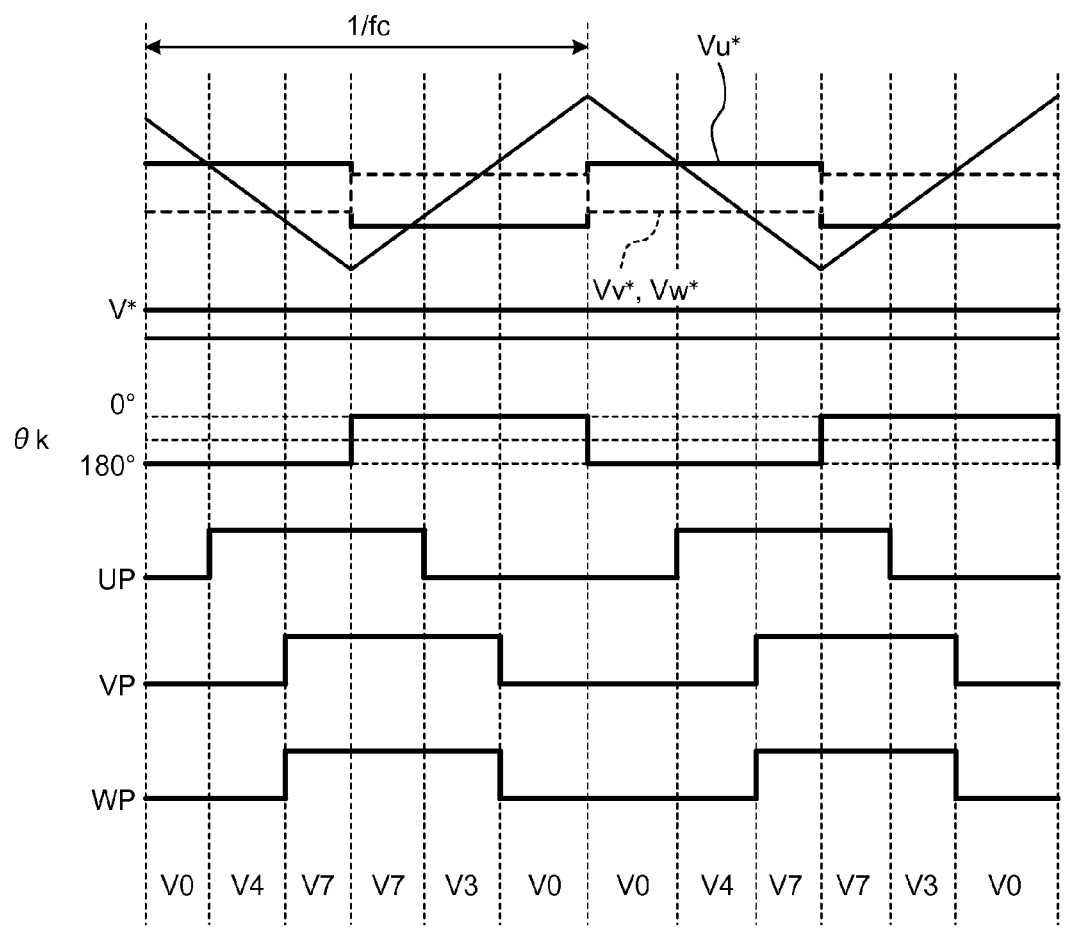
FIG. 5 is a diagram showing an example of PWM signals generated when V* is any value and 0° and 180° are switched as a high-frequency phase command θk output by a heating command unit.

FIG. 5 is a diagram showing an example of PWM signals generated when V* is any value and 0° and 180° are switched as the high-frequency phase command θk output by the heating command unit 29. The PWM-signal generating unit 24 can generate the PWM signals synchronized with the carrier signal by switching the high-frequency phase command θk between 0° and 180° at the top or the bottom (or the top and the bottom) of the carrier signal (a triangular wave). In this case, the voltage vector changes in the order of V0 (UP=VP=WP=0), V4 (UP=1, VP=WP=0), V7 (UP=VP=WP=1), V3 (UP=0, VP=WP=1), V0 (UP=VP=WP=0), and the like.

Figure 6:
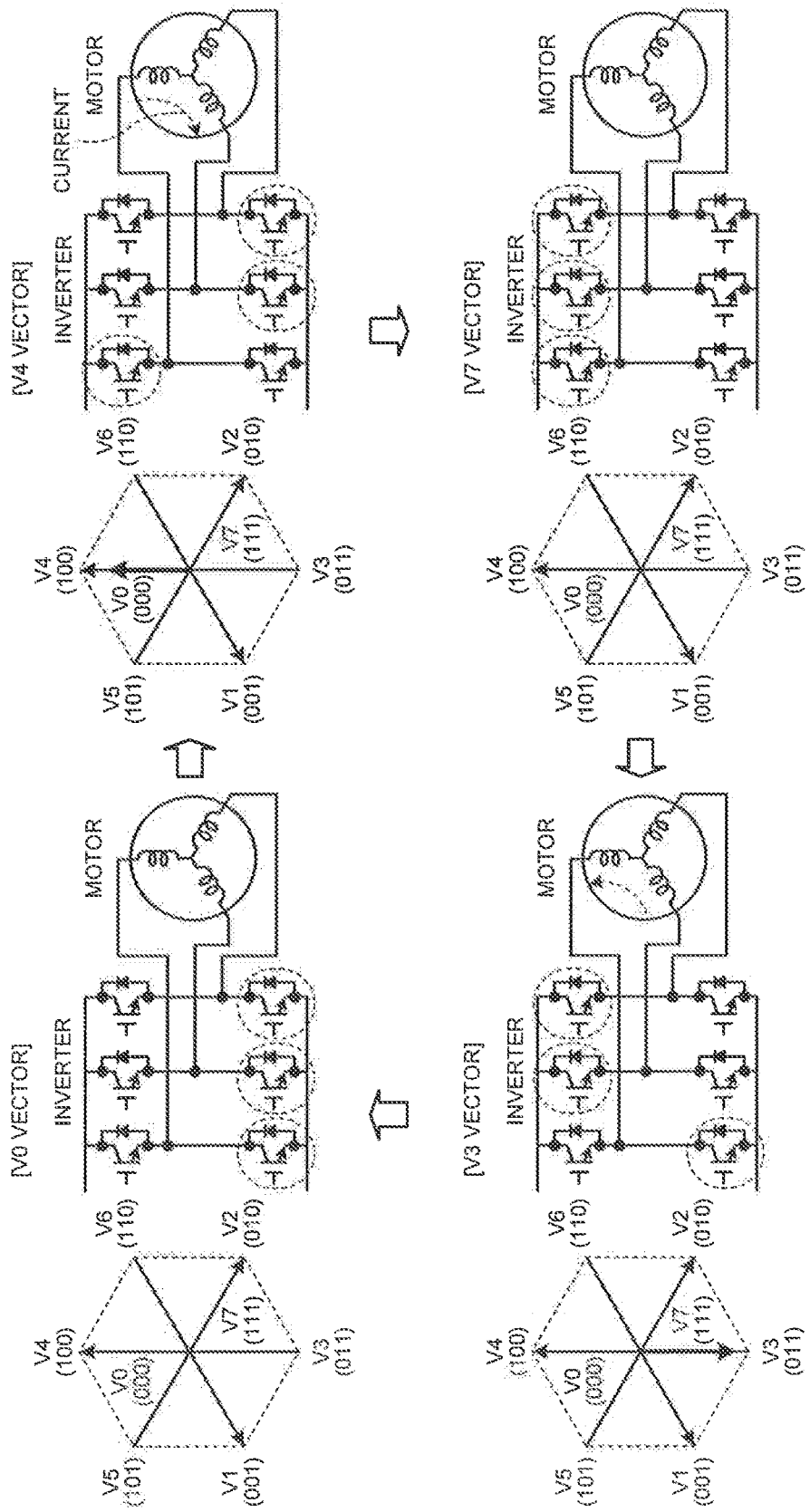
FIG. 6 is an explanatory diagram of a change of a voltage vector corresponding to the operation shown in FIG. 5.

FIG. 6 is an explanatory diagram of a change of the voltage vector corresponding to the operation shown in FIG. 5. FIG. 6 indicates that the switching elements surrounded by broken lines are on and the switching elements not surrounded by broken lines are off. As shown in FIG. 6, when the V0 vector or the V7 vector is applied, the lines of the motor 8 are short-circuited and any voltage is not output. In this case, the energy accumulated in the inductance of the motor 8 becomes a current and the current flows in the short circuit. When the V4 vector is applied, a current (current of +Iu) in the U-phase direction, which flows into the motor 8 via the U-phase and flows out from the motor 8 via the V-phase and the W-phase, flows, and when the V3 vector is applied, a current (current of −Iu) in the −U phase direction, which flows into the motor 8 via the V-phase and the W-phase and flows out from the motor 8 via the U-phase, flows to the windings of the motor 8. In other words, when the V4 vector is applied, the current flows to the windings of the motor 8 in the opposite direction to the case when the V3 vector is applied. Because the voltage vector changes in order of V0, V4, V7, V3, V0, and so on, the current of +Iu and the current of −Iu flow to the windings of the motor 8 alternately. Particularly, as shown in FIG. 6, the V4 vector and the V3 vector appear during one carrier cycle (1/fc); therefore, an AC voltage synchronized with the carrier frequency fc can be applied to the windings of the motor 8. Because the V4 vector (current of +Iu) and the V3 vector (current of −Iu) are alternately output, forward and reverse torques are switched instantaneously. Thus, the torques are canceled; therefore, control can be performed such that vibrations of the rotor are suppressed.

Next, the operation of the inverter control unit 10 is explained. An explanation is made here of the control operation of the inverter unit 9 when the heat pump device 100 operates in the heating operation mode in which the compressor 1 is heated. The control operation of the inverter unit 9 when the heat pump device 100 operates in the normal operation mode is similar to that in conventional techniques; therefore, an explanation thereof is omitted.

Figure 7:
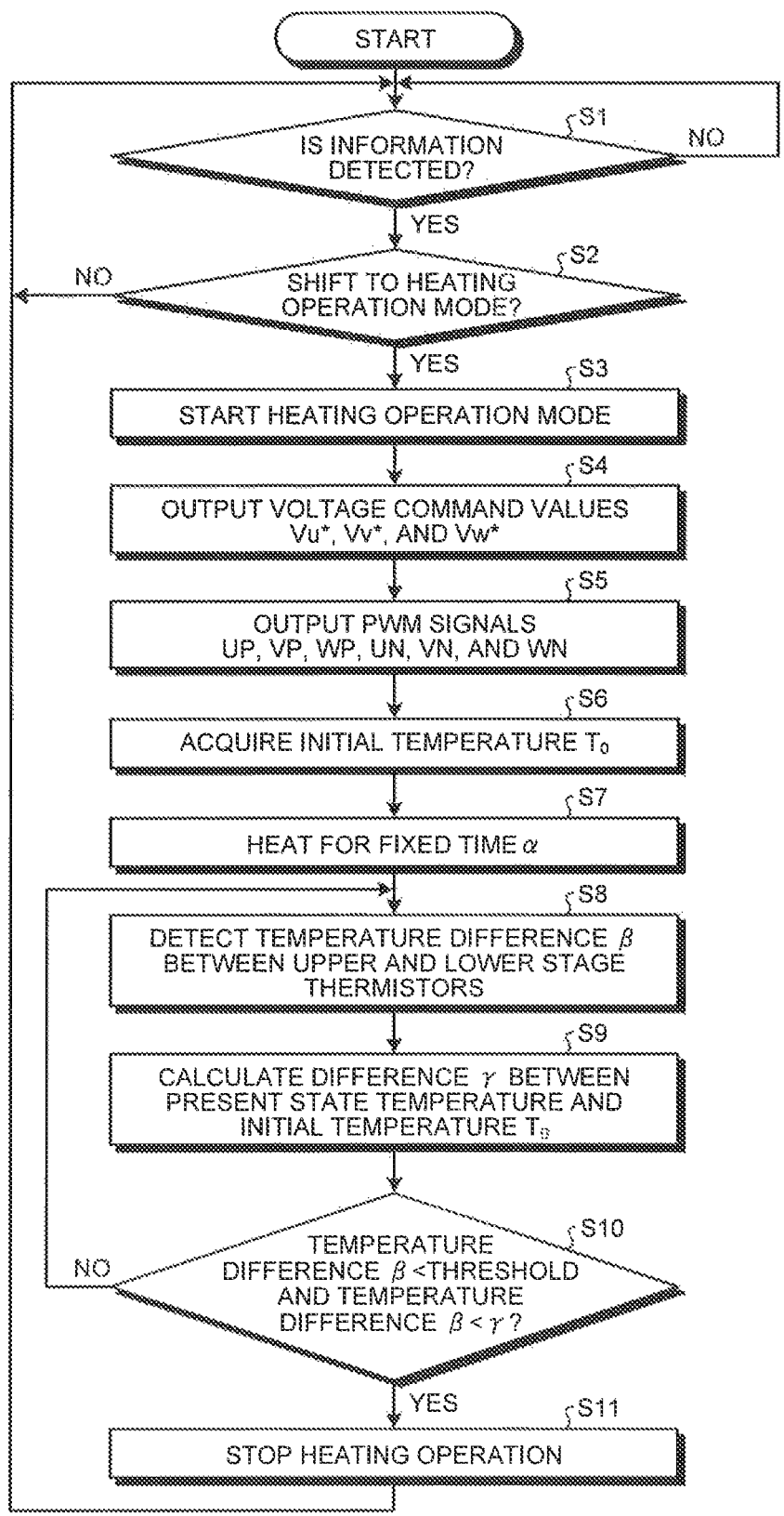
FIG. 7 is a flowchart showing an operation example in a heating control mode of an inverter control unit included in the heat pump device in the first embodiment.

FIG. 7 is a flowchart showing an operation example of the inverter control unit 10 included in the heat pump device 100 in the first embodiment and shows the control procedure at the time of the heating operation mode. In other words, FIG. 7 shows the control procedure in a case when the heating-operation-mode control unit 12 and the driving-signal generating unit 15 generate the PWM signals as driving signals for the inverter unit 9.

Figure 8:
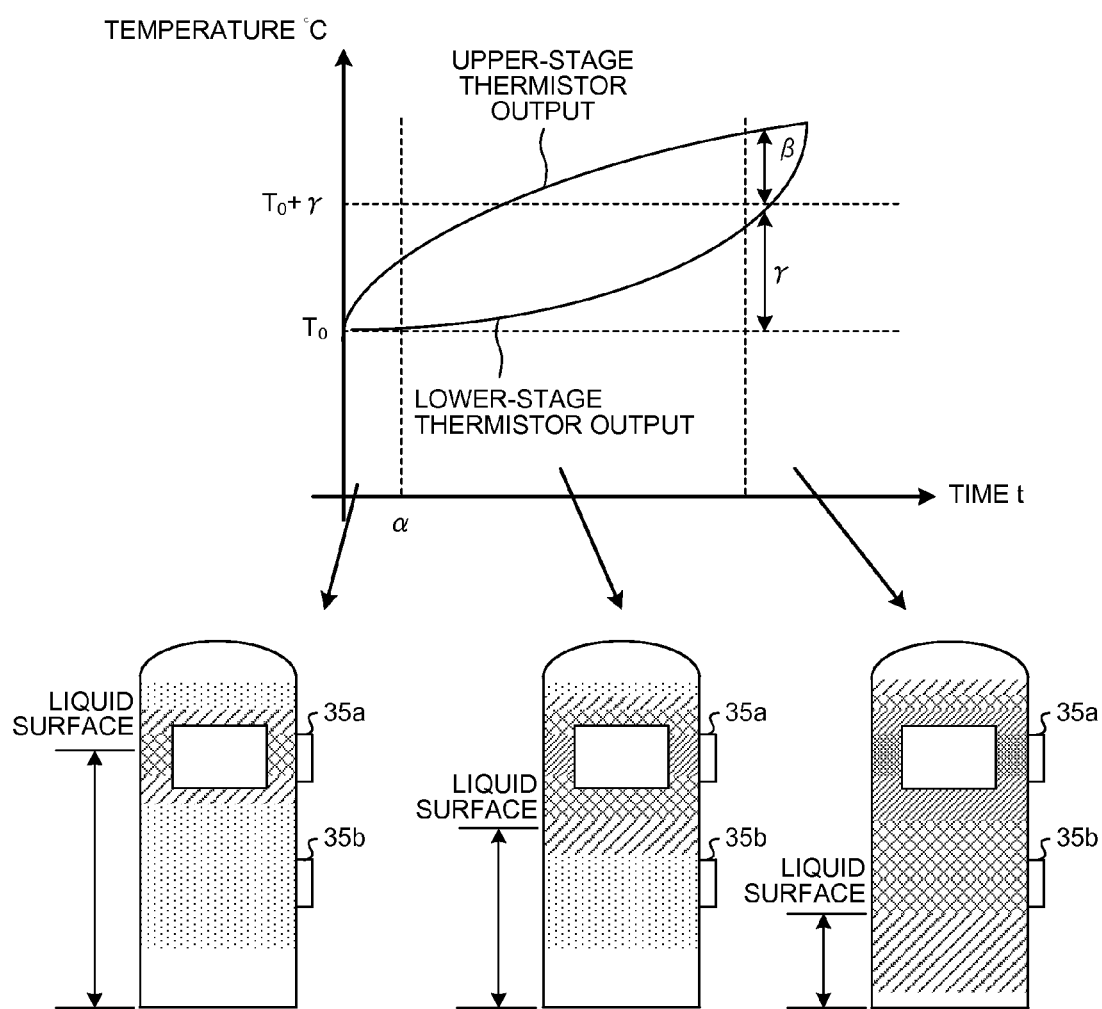
FIG. 8 is a diagram showing outputs from temperature sensors included in a compressor 1 and a state of a temperature change of the compressor.

FIG. 8 is a diagram showing the outputs from the temperature sensors 35a and 35b included in the compressor 1 and a state of a temperature change of the compressor 1. In the upper-side figure in FIG. 8, the horizontal axis indicates the time (elapsed time) t from when heating is started and the vertical axis indicates the temperature of the upper-stage thermistor (the temperature sensor 35a) set in the upper part of the compressor 1 and the lower-stage thermistor (the temperature sensor 35b) set in the lower part of the compressor 1. In the lower-side figure of FIG. 8, the temperature is indicated by gradations of colors. A darker color indicates a higher temperature. As shown in FIG. 8, because the compressor 1 has a relatively large heat capacity, the compressor 1 is in a temperature uniform state in a stopped state before heating and there is almost no difference between the detection values of the temperature sensors. However, because the motor 8 is set in the upper part in the compressor 1, when the heating is started, first, the temperature of the upper part rises earlier. Subsequently, the temperature of the lower part rises following the temperature rise of the upper part. It is seen that, when a fixed time elapses, there is no difference between the temperature sensors 35a and 35b.

In the present embodiment, the refrigerant amount is accurately estimated and appropriate heating is performed using such a temperature change of the compressor 1. For example, when the difference between the detection results of the temperature sensors 35a and 35b is represented as a temperature difference $\beta$, the initial temperature (temperature at the start of the heating operation mode) obtained by the temperature sensors 35a and 35b is represented as $T_0$, and the difference between the temperature obtained by the temperature sensors 35a and 35b and the initial temperature $T_0$ is represented as $\gamma$, it is possible to estimate the refrigerant amount using $\beta$ and $\gamma$. When $\beta$ is small and $\gamma$ is small, it can be determined that the state in this case is close to the state at the start of the heating operation mode and the refrigerant amount is large. As $\beta$ increases, the refrigerant amount decreases. However, when a certain degree of time elapses from when heating is started, $\beta$ decreases. On the other hand, $\gamma$ increases as the time elapses from when heating is started. It is possible to store a relation between the values of $\beta$ and $\gamma$ and the estimated amounts of the refrigerant amount as a conditional expression or in a table format on the basis of such a relation shown in FIG. 8 and calculate the estimated amount of the refrigerant amount corresponding to the values of $\beta$ and $\gamma$.

It is also possible to store a relation between the temperatures detected by the temperature sensors 35a and 35b and the estimated amounts of the refrigerant amount as a conditional expression or in a table format rather than $\beta$ and $\gamma$ and calculate the estimated amount of the refrigerant amount on the basis of the detection results of the temperature sensors 35a and 35b. Further, it is also possible to store a relation between the values of the temperature sensors 35a and 35b and the output (e.g., the high-frequency phase command $\theta k$) of the inverter unit 9 without the intervention of intermediate processing of estimation of the refrigerant amount and directly calculate the high-frequency phase command $\theta k$ on the basis of the detection results of the temperature sensors 35a and 35b.

An example of a control procedure during the heating operation mode in the present embodiment is explained with reference to FIGS. 7 and 8. First, the heating-operation-mode control unit 12 of the inverter control unit 10 determines whether the compressor 1 is in a standby state and information for determining whether to shift to the heating operation mode is detected (step S1). The information for determining whether it is necessary to shift to the heating operation mode is, for example, information from the ambient-temperature detecting unit 31 and the temperature sensors 35a and 35b of the compressor 1 and information concerning whether an operation command is input from the outside. When the information for determining whether to shift to the heating operation mode is detected (Yes at step S1), the heating-operation-mode control unit 12 determines, on the basis of the acquired information, whether it is necessary to shift to the heating operation mode (step S2). At step S2, for example, when a predetermined operation command (an operation start command for the heat pump device 100) is input from the outside and occurrence of the refrigerant stagnation phenomenon at that point is predicted (e.g., when the tilt of the environmental temperature around the heat pump device 100 is equal to or higher than a threshold), the heating-operation-mode control unit 12 determines that the operation in the heating operation mode is necessary.

When the information for determining whether shift to the heating operation mode is not detected (the operation in the heating operation mode is unnecessary) (No at step S1) or when it is determined in the determination at step S2 that it is not necessary to shift to the heating operation mode (No at step S2), the processing returns to step S1.

When it is determined that it is necessary to shift to the heating operation mode (Yes at step S2), the heating-operation-mode control unit 12 detects input and output currents and voltages of the motor 8 and starts the heating operation mode (step S3). The driving-signal generating unit 15 generates and outputs the voltage command values Vu*, Vv*, and Vw* on the basis of $\theta k$ and Vk output from the heating-operation-mode control unit 12 (step S4). The driving-signal generating unit 15 generates and outputs the PWM signals (UP, UN, VP, VN, WP, and WN) on the basis of the voltage command values Vu*, Vv*, and Vw* (step S5) and controls the inverter unit 9. The input and output currents and voltages are electric currents and voltages (for three phases) detected at a connection point of the inverter unit 9 and the motor 8.

Subsequently, the refrigerant-amount estimating unit 14 of the heating-operation-mode control unit 12 detects the initial temperature $T_0$ as a signal from the temperature sensors 35a and 35b (step S6). It is assumed that the temperatures indicated by the temperature sensors 35a and 35b coincide with each other at the start of the heating operation mode. However, when the temperatures are different from each other, the average of the temperatures can be used as the initial temperature $T_0$ or any one of the temperatures can be set as the initial temperature $T_0$.

The heating command unit 29 maintains the heating operation mode for a fixed time $\alpha$ from when the heating operation mode is started (step S7). Note that the heating command unit 29 is set to carry out heating irrespective of the estimation result of the refrigerant amount or the like, for example, for the fixed time $\alpha$ from when the heating operation mode is started.

When the fixed time $\alpha$ elapses from when the heating control mode is started, the refrigerant-amount estimating unit 14 calculates the temperature difference $\beta$, which is a difference between the detection results of the temperature sensors 35a and 35b (the upper and lower stage thermistors) (step S8). The refrigerant-amount estimating unit 14 then calculates the difference $\gamma$ between the initial temperature $T_0$ and the detection results of the temperature sensors 35a and 35b (step S9) and determines, on the basis of these pieces of information, whether the temperature difference $\beta$ is equal to or smaller than a threshold and the temperature difference $\beta$ is equal to or smaller than $\gamma$ (step S10). Note that, in an example shown in FIG. 8, the difference γ is a difference between the lower one of the temperatures detected by the temperature sensors 35a and 35b and $T_0$.

When the temperature difference β is equal to or smaller than the threshold, this indicates that the difference between the detection results of the temperature sensors 35a and 35b is small and it is considered that the compressor 1 is in the period of time at the right end or the left end in FIG. 8. When the temperature difference β is equal to or smaller than γ, it is considered that the time equal to or longer than a fixed time elapses and the compressor 1 is in the period of time near the center or the period of time at the right end in FIG. 8. When at least one of these two conditions is not satisfied, it is considered that the compressor 1 is in the period of time at the left end or in the center in which the stagnated refrigerant is not eliminated and the heating operation (the heating operation mode) is continued. When both the two conditions are satisfied, it is possible to determine that the compressor 1 is in the period of time at the right end in FIG. 8 and it is considered that the stagnated refrigerant is eliminated (a liquid surface is sufficiently low). Note that, in the heating operation mode, it is possible to carry out efficient heating by determining and controlling θk on the basis of β and γ as explained above.

Therefore, the refrigerant-amount estimating unit 14 outputs, on the basis of the two conditions, as an estimation result of the refrigerant amount (the refrigerant state), an estimation result indicating whether the stagnated refrigerant is eliminated to the heating command unit 29. The heating command unit 29 determines, on the basis of the input estimation result, whether the heating operation mode is continued.

That is, when it is determined by the refrigerant-amount estimating unit 14 that the temperature difference β is equal to or smaller than the threshold and the temperature difference β is equal to or smaller than γ (Yes at step S10), the heating command unit 29 stops the heating operation (step S11). The processing returns to step S1.

When it is determined by the refrigerant-amount estimating unit 14 that the temperature difference β is not equal to or smaller than the threshold and the temperature difference β is not equal to or smaller than γ (No at step S10), the processing returns to step S8 and the heating operation is continued.

As explained above, in the heat pump device in the present embodiment, the inverter control unit 10 estimates the refrigerant amount from the detection results of the temperature sensors 35a and 35b included in the compressor 1, determines a voltage phase on the basis of the estimation result and the necessary amount of heat generation, generates PWM signals, and controls the inverter unit 9. Consequently, it is possible to accurately detect the refrigerant amount in the compressor 1 and allow the liquid refrigerant stagnated in the compressor 1 to leak to the outside with only a necessary sufficient amount of heating. That is, it is possible to stably and efficiently heat the compressor 1.

In addition, when the heating-operation-mode control unit 12 controls the inverter unit 9 such that a high-frequency voltage outside the audible frequency range (20 hertz to 20 kilohertz) is applied to the motor 8, it is possible to suppress noise in heating the motor 8.

Generally, the operation frequency when the compressor is in operation is 1 kilohertz at most. Therefore, a high-frequency voltage having a frequency equal to or higher than 1 kilohertz only has to be applied to the motor 8. If a voltage having a frequency equal to or higher than 14 kilohertz is applied to the motor 8, vibration sound of the iron core of the motor 8 approaches nearly the upper limit of the audible frequency range. Therefore, noise can be reduced. Therefore, for example, it is satisfactory to apply a high-frequency voltage of about 20 kilohertz, which is outside the audible frequency range.

However, when the frequency of the high-frequency voltage exceeds the maximum rated frequency of the switching elements 21a to 21f, load or power supply short-circuit may occur due to the breakage of the switching elements, and this can lead to the generation of smoke or creation of a fire. For this reason, it is desired to set the frequency of the high-frequency voltage to be equal to or lower than the maximum rated frequency, thereby ensuring the reliability.

In the case of a heating device having a frequency exceeding 10 kilohertz and an output exceeding 50 watts, because there is the restriction due to Article 100 of the Radio law, it is possible to perform heating of the compressor 1 conforming to the Radio law by adjusting the amplitude of a voltage command beforehand not to exceed 50 watts and detecting a flowing electric current and feeding back the electric current to set the output to be equal to or lower than 50 watts.

In the present embodiment, the refrigerant amount is estimated on the basis of the temperatures detected by the temperature sensors 35a and 35b. However, it is also possible to detect a liquid surface by setting, for example, an ammeter for measuring a leak current, an insulation resistance sensor for measuring a resistance value, or a viscosity sensor for measuring viscosity in the compressor 1 instead of the temperature sensors 35a and 35b and estimate the refrigerant amount.

Second Embodiment

A heat pump device in a second embodiment according to the present invention is explained. Note that the configuration of the heat pump device in the present embodiment is the same as the configuration in the first embodiment. Components having the same functions as the functions in the first embodiment are denoted by reference numerals and signs same as those in the first embodiment and redundant explanation of the components is omitted.

Figure 9:
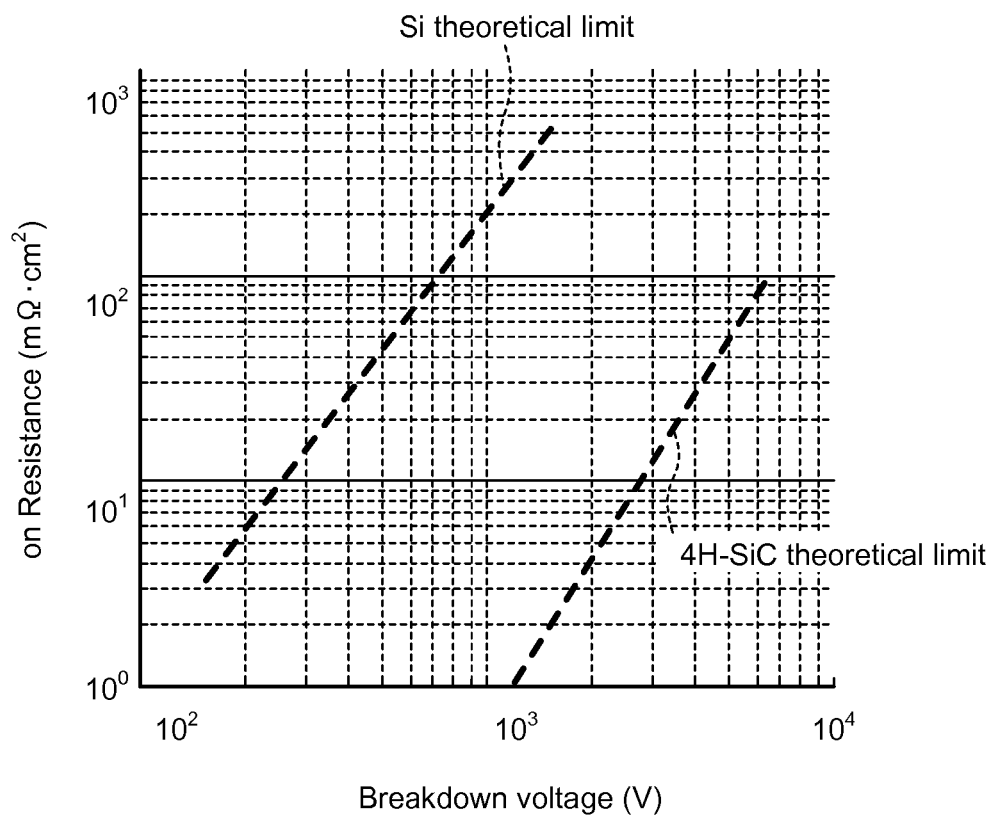
FIG. 9 is a diagram showing the relation between the breakdown voltage and the on resistance of a silicon device (hereinafter, Si device) and an SiC device.

FIG. 9 is a diagram showing the relation between the breakdown voltage and the on resistance of a silicon device (hereinafter, Si device) and an SiC device. The heat pump device in the second embodiment is explained with reference to FIG. 9. The heat pump device in the present embodiment is such that the switching elements 21a to 21f shown in FIG. 2 are switching elements of a silicon carbide device (hereinafter, SiC device). Currently, it is typically mainstream to use semiconductors made of silicon (Si). It is known that an SiC device has a larger bandgap than an Si device and can significantly improve the trade-off between the breakdown voltage and the on resistance. For example, a cooling device and a radiator fin are essential for currently used induction heating cookers in which Si devices are used, and the element loss can be significantly reduced by using SiC devices, which are wide bandgap semiconductor devices. Therefore, conventional cooling devices and radiator fins can be reduced in size or eliminated. Wide bandgap semiconductors other than SiC include, for example, a gallium nitride material and diamond.

As described above, the loss can be significantly reduced by changing the switching elements from conventional Si devices to SiC devices; therefore, cooling devices and radiator fins can be reduced in size or eliminated. Accordingly, the cost of the device itself can be significantly reduced. Moreover, switching can be performed at high frequency; therefore, a current with a higher frequency can be caused to flow in the motor 8. Accordingly, the winding current is reduced due to the increase of the winding impedance of the motor 8; therefore, the current flowing in the inverter unit 9 is reduced. Thus, a heat pump device with a higher efficiency can be obtained. The increase in frequency enables the driving frequency to be set to a high frequency equal to or higher than 16 kilohertz, which is within the human audible range; therefore, there is an advantage in that it is easy to take measures against noise.

Moreover, when SiC is used, a very large current can be caused to flow with low loss compared with the case of the conventional Si; therefore, it is possible to obtain effects, such as reducing the size of cooling fins. In the present embodiment, an SiC device is explained as an example; however, it will be apparent to those skilled in the art that similar effects are obtained by using wide bandgap semiconductor devices formed from diamond, gallium nitride (GaN), or the like instead of SiC. A wide bandgap semiconductor may be used only for the diode of each switching element included in the inverter. Moreover, part of (at least one of) a plurality of switching elements may be formed from a wide bandgap semiconductor. The effects described above can be obtained even when a wide bandgap semiconductor is used for only part of the elements.

In the first and second embodiments, a case is assumed where IGBTs are mainly used as the switching elements; however, the switching elements are not limited to IGBTs, and it is apparent to those skilled in the art that similar effects are obtained even by using power MOSFETs (Metal-Oxide-Semiconductor Field-Effect Transistors) having a super junction structure or other insulated gate semiconductor devices, or bipolar transistors.

Third Embodiment

Figure 10:
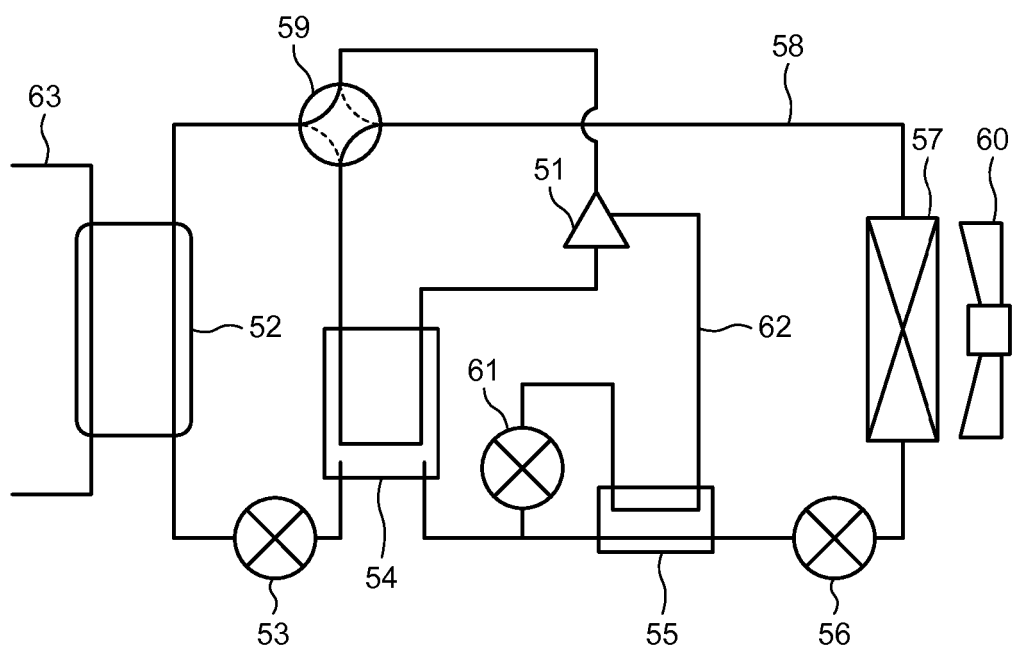
FIG. 10 is a diagram showing a configuration example of a heat pump device in a third embodiment.

FIG. 10 is a diagram showing a configuration example of a third embodiment of the heat pump device according to the present invention. In the present embodiment, an explanation will be given of an example of configurations and operations when the heat pump device explained in the first and second embodiments is mounted on an air conditioner, a heat pump water heater, a refrigerator, a freezer, and the like.

Figure 11:
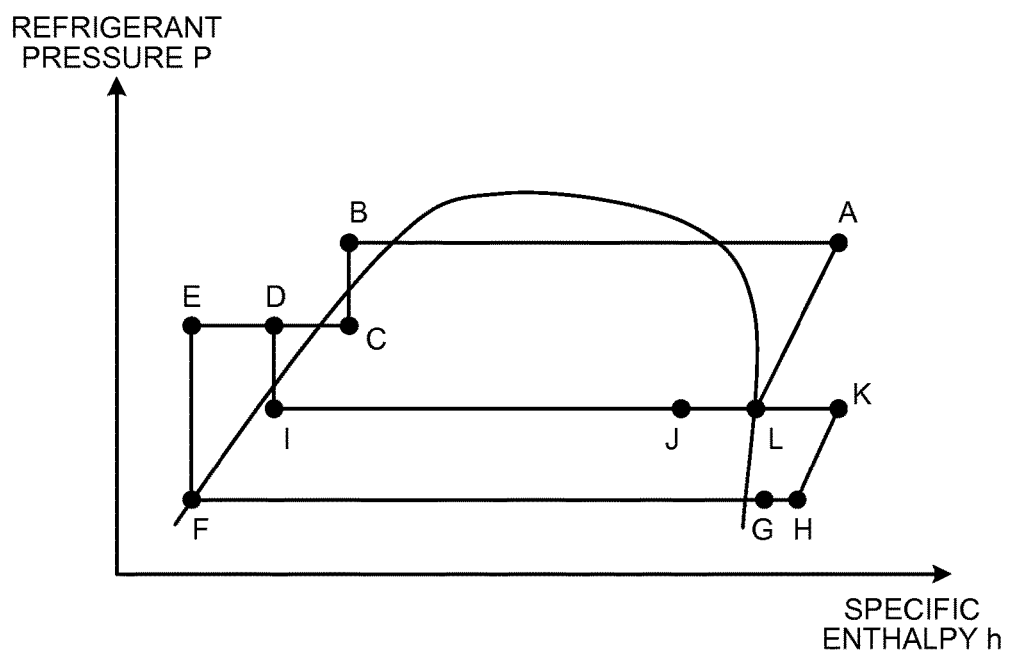
FIG. 11 is a Mollier chart of a state of a refrigerant of the heat pump device shown in FIG. 10.

FIG. 11 is a Mollier diagram of the state of the refrigerant of the heat pump device shown in FIG. 10. In FIG. 11, the horizontal axis indicates the specific enthalpy and the vertical axis indicates the refrigerant pressure.

In the heat pump device in the present embodiment, a compressor 51, a heat exchanger 52, an expansion mechanism 53, a receiver 54, an internal heat exchanger 55, an expansion mechanism 56, and a heat exchanger 57 are sequentially connected by a pipe, thereby configuring a main refrigerant circuit 58 through which the refrigerant circulates. In the main refrigerant circuit 58, a four-way valve 59 is provided on the discharge side of the compressor 51; therefore, the circulation direction of the refrigerant can be switched. A fan 60 is provided near the heat exchanger 57. The compressor 51 is the compressor 1 explained in the first and second embodiments described above and is a compressor that includes the motor 8 driven by the inverter unit 9 and the compression mechanism 7 (see FIG. 1). Furthermore, the heat pump device includes an injection circuit 62 that connects, by a pipe, from between the receiver 54 and the internal heat exchanger 55 to an injection pipe of the compressor 51. An expansion mechanism 61 and the internal heat exchanger 55 are sequentially connected to the injection circuit 62. A water circuit 63, in which water is circulated, is connected to the heat exchanger 52. A device that uses water, such as a hot water dispenser and a radiator, examples of which include a floor heating, is connected to the water circuit 63.

The operation of the heat pump device having the above configuration is explained. First, an operation during the heating operation is explained. In the heating operation, the four-way valve 59 is set in the direction of the solid line. The heating operation includes not only heating used for air conditioning but also a hot-water supply for applying heat to water to make hot water.

The gas-phase refrigerant (at point A in FIG. 11) that has become a refrigerant having a high temperature and a high pressure in the compressor 51 is discharged from the compressor 51 and exchanges heat in the heat exchanger 52, which functions as a condenser and a radiator, to be liquefied (at point B in FIG. 11). At this point, water circulating in the water circuit 63 is heated by the heat radiated from the refrigerant and is used for heating and hot-water supply.

The liquid-phase refrigerant liquefied in the heat exchanger 52 is decompressed in the expansion mechanism 53 and enters a gas-liquid two-phase state (at point C in FIG. 11). The refrigerant that has entered a gas-liquid two-phase state in the expansion mechanism 53 exchanges heat with the refrigerant drawn into the compressor 51 by the receiver 54 so as to be cooled and liquefied (at point D in FIG. 11). The liquid-phase refrigerant liquefied in the receiver 54 is divided between the main refrigerant circuit 58 and the injection circuit 62 and flows therein.

The liquid-phase refrigerant flowing in the main refrigerant circuit 58 exchanges heat with the refrigerant flowing in the injection circuit 62 (refrigerant that is decompressed in the expansion mechanism 61 and has entered a gas-liquid two-phase state) in the internal heat exchanger 55 and is further cooled (at point E in FIG. 11). The liquid-phase refrigerant cooled in the internal heat exchanger 55 is decompressed in the expansion mechanism 56 and enters a gas-liquid two-phase state (at point F in FIG. 11). The refrigerant that has entered a gas-liquid two-phase state in the expansion mechanism 56 exchanges heat with the outside air in the heat exchanger 57, which functions as an evaporator, and is heated (at point G in FIG. 11). The refrigerant heated in the heat exchanger 57 is further heated in the receiver 54 (at point H in FIG. 11) and is drawn into the compressor 51.

On the other hand, as described above, the refrigerant flowing through the injection circuit 62 is decompressed in the expansion mechanism 61 (at point I in FIG. 11) and exchanges heat in the internal heat exchanger 55 (at point J in FIG. 11). The refrigerant (injection refrigerant) that has exchanged heat in the internal heat exchanger 55 and is in the gas-liquid two-phase state flows into the compressor 51 from the injection pipe of the compressor 51 while remaining in the gas-liquid two-phase state.

In the compressor 51, the refrigerant drawn in from the main refrigerant circuit 58 (at point H in FIG. 11) is compressed to an intermediate pressure and heated (at point K in FIG. 11). The injection refrigerant (at point J in FIG. 11) joins the refrigerant compressed to the intermediate pressure and heated (at point K in FIG. 11), thereby decreasing the temperature (at point L in FIG. 11). The refrigerant having the decreased temperature (at point L in FIG. 11) is further compressed and heated to have a high temperature and a high pressure, and is discharged (at point A in FIG. 11).

When the injection operation is not performed, the aperture of the expansion mechanism 61 is fully closed. In other words, when the injection operation is performed, the aperture of the expansion mechanism 61 is larger than a predetermined aperture. However, when the injection operation is not performed, the aperture of the expansion mechanism 61 is set to be smaller than the predetermined aperture. Accordingly, the refrigerant does not flow into the injection pipe of the compressor 51. The aperture of the expansion mechanism 61 is electronically controlled by using a microcomputer or the like.

The operation of the heat pump device 100 during the cooling operation is explained next. In the cooling operation, the four-way valve 59 is set in the direction indicated by the broken line. The cooling operation includes not only cooling used for air conditioning but also drawing heat from water to make cold water, performing refrigeration, and the like.

The gas-phase refrigerant (at point A in FIG. 11) that has become a refrigerant having a high temperature and a high pressure in the compressor 51 is discharged from the compressor 51, flows to the heat exchanger 57 side through the four-way valve 59, and exchanges heat in the heat exchanger 57, which functions as a condenser and a radiator, to be liquefied (at point B in FIG. 11). The liquid-phase refrigerant liquefied in the heat exchanger 57 is decompressed in the expansion mechanism 56 and enters a gas-liquid two-phase state (at point C in FIG. 11). The refrigerant that has entered a gas-liquid two-phase state in the expansion mechanism 56 exchanges heat with the refrigerant flowing in the injection circuit 62 in the internal heat exchanger 55 so as to be cooled and liquefied (at point D in FIG. 11). In the internal heat exchanger 55, the refrigerant that has entered a gas-liquid two-phase state in the expansion mechanism 56 exchanges heat with the refrigerant (at point I in FIG. 11) that has entered a gas-liquid two-phase state by decompressing the liquid-phase refrigerant liquefied in the internal heat exchanger 55, in the expansion mechanism 61. The liquid-phase refrigerant (at point D in FIG. 11) exchanged heat in the internal heat exchanger 55 is divided between the main refrigerant circuit 58 and the injection circuit 62 and flows therein.

The liquid-phase refrigerant flowing in the main refrigerant circuit 58 then exchanges heat with the refrigerant drawn into the compressor 51 in the receiver 54 and is further cooled (at point E in FIG. 11). The liquid-phase refrigerant cooled in the receiver 54 is decompressed in the expansion mechanism 53 and enters a gas-liquid two-phase state (at point F in FIG. 11). The refrigerant that has entered a gas-liquid two-phase state in the expansion mechanism 53 exchanges heat in the heat exchanger 52, which functions as an evaporator, and is heated (at point G in FIG. 11). At this point, because the refrigerant absorbs heat, water circulating in the water circuit 63 is cooled and used for cooling and refrigeration. Then, the refrigerant heated in the heat exchanger 52 flows to the receiver 54 through the four-way valve 59 and is further heated in the receiver 54 (at point H in FIG. 11) and drawn into the compressor 51.

On the other hand, as described above, the refrigerant flowing through the injection circuit 62 is decompressed in the expansion mechanism 61 (at point I in FIG. 11) and exchanges heat in the internal heat exchanger 55 (at point J in FIG. 11). The refrigerant (injection refrigerant) that has exchanged heat in the internal heat exchanger 55 and is in the gas-liquid two-phase state flows into the compressor 51 from the injection pipe of the compressor 51 while remaining in the gas-liquid two-phase state. A compressing operation in the compressor 51 is the same as the compressing operation during the heating operation explained above.

When the injection operation is not performed, as in the heating operation described above, the aperture of the expansion mechanism 61 is fully closed so as not to result in the refrigerant flowing into the injection pipe of the compressor 51.

In the above explanations, the heat exchanger 52 has been explained as a heat exchanger like a plate type heat exchanger that exchanges heat between the refrigerant and water circulating in the water circuit 63. However, the heat exchanger 52 is not limited thereto and may be other types of heat exchangers that exchange heat between a refrigerant and air. The water circuit 63 may not be a circuit in which water is circulated, but may be a circuit in which a fluid other than water is circulated.

As described above, the heat pump device explained in the first and second embodiments can be used for a heat pump device using an inverter compressor in an air conditioner, a heat pump water heater, a refrigerator, a freezer, and the like.

INDUSTRIAL APPLICABILITY

As explained above, the heat pump device according to the present invention is useful for a heat pump device that efficiently eliminates the refrigerant stagnation phenomenon and attains power saving.

The invention claimed is:
1. A heat pump device comprising:
a compressor that includes a compression mechanism that compresses a refrigerant and a motor that drives the compression mechanism;
an inverter that applies a voltage for driving the motor;
an inverter control unit that generates a driving signal for driving the inverter; and
a plurality of temperature sensors that detect a temperature of the compressor, wherein
the inverter control unit is configured with: (i) a normal operation mode in which a refrigerant is compressed by performing a normal operation of the compressor and (ii) a heating operation mode in which a heating operation of the compressor is performed by applying, to the motor, a voltage having a higher frequency than that in the normal operation mode, and
in the heating operation mode, the inverter control unit is further configured to generate the voltage according to a temperature detected by the plurality of temperature sensors,
wherein the inverter control unit is further configured to:
determine an estimation result indicating that the refrigerant which is stagnated is eliminated from the compressor based on both (i) a temperature difference between the initial temperatures at the start of the heating operation mode and current temperatures detected by the temperature sensors being below a first predetermined threshold, and (ii) a temperature difference between current temperatures detected by an upper stage thermistor and a lower stage thermistor of the plurality of temperature sensors being below a second predetermined threshold;
responsive to the estimation result:
operate in the heating operation mode which applies the voltage with the higher frequency, responsive to the estimation result based on the plurality of temperature sensors indicating that the refrigerant which is stagnated is not eliminated from the compressor; and operate in the normal operation mode, responsive to the estimation result based on the plurality of temperature sensors indicating that the refrigerant which is stagnated is not eliminated from the compressor.

2. The heat pump device according to claim 1, wherein a frequency of the voltage to be applied to the motor in the heating operation mode is capable of being changed.

3. The heat pump device according to claim 1, wherein the inverter control unit stores in advance a correspondence table of a temperature detected by the plurality of temperature sensors and an inverter output and selects an inverter output on a basis of a detection result by the plurality of temperature sensors and the correspondence table.

4. The heat pump device according to claim 1, comprising:
 a refrigerant-amount estimating unit that estimates a refrigerant amount on a basis of detection results of the plurality of temperature sensors; and
 a high-frequency energization unit that determines, on a basis of a refrigerant amount estimated by the refrigerant-amount estimating unit, at least one of an amplitude and a phase of the voltage.

5. The heat pump device according to claim 1, wherein the inverter includes a plurality of switching elements and at least one of the switching elements is formed from a wide bandgap semiconductor.

6. The heat pump device according to claim 1, wherein the inverter includes a plurality of switching elements and at least one of diodes of the switching elements is formed from a wide bandgap semiconductor.

7. The heat pump device according to claim 5, wherein the wide bandgap semiconductor is silicon carbide, a gallium nitride material, or diamond.

8. The heat pump device according to claim 1, wherein, when a frequency of the voltage exceeds 10 kilohertz, the inverter control unit controls input power to the motor to 50 watts or less.

9. An air conditioner comprising the heat pump device according to claim 1.

10. A freezer comprising the heat pump device according to claim 1.

11. The heat pump device according to claim 6, wherein the wide bandgap semiconductor is silicon carbide, a gallium nitride material, or diamond.

12. A heat pump device comprising:
a compressor that includes a compression mechanism that compresses a refrigerant and a motor that drives the compression mechanism;
an inverter that applies a voltage for driving the motor;
an inverter control unit that generates a driving signal for driving the inverter; and
a temperature sensor that detects a temperature of the compressor, wherein
the inverter control unit is configured with (i) a normal operation mode in which a refrigerant is compressed by performing a normal operation of the compressor and (ii) a heating operation mode in which a heating operation of the compressor is performed by applying, to the motor, a voltage having a higher frequency than that in the normal operation mode, and
in the heating operation mode, the inverter control unit determines a phase of the voltage for driving the motor according to a temperature detected by the temperature sensor,
wherein the inverter control unit is further configured to:
 determine an estimation result indicating that the refrigerant which is stagnated is eliminated from the compressor based on both (i) a temperature difference between the initial temperatures at the start of the heating operation mode and current temperatures detected by the temperature sensor being below a first predetermined threshold, and (ii) a temperature difference between current temperatures detected by an upper stage thermistor and a lower stage thermistor of the temperature sensor being below a second predetermined threshold;
 responsive to the estimation result:
  operate in the heating operation mode which applies the voltage with the higher frequency, responsive to the estimation result based on the temperature sensor indicating that the refrigerant which is stagnated is not eliminated from the compressor; and
  operate in the normal operation mode, responsive to the estimation result based on the temperature sensor indicating that the refrigerant which is stagnated is not eliminated from the compressor.

13. A refrigerator comprising the heat pump device according to claim 1.

* * * * *